(12) United States Patent
Cadiz et al.

(10) Patent No.: US 7,593,925 B2
(45) Date of Patent: Sep. 22, 2009

(54) METHOD AND SYSTEM FOR LOCATING CONTACT INFORMATION COLLECTED FROM CONTACT SOURCES

(75) Inventors: Jonathan J. Cadiz, Redmond, WA (US); Sumit Chakravarty, Kirkland, WA (US); Venkateshaiah Setty, Bellevue, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 11/067,615

(22) Filed: Feb. 25, 2005

(65) Prior Publication Data

US 2006/0195474 A1    Aug. 31, 2006

(51) Int. Cl.
G06F 7/00 (2006.01)
G06F 17/30 (2006.01)
(52) U.S. Cl. .............. 707/3; 707/10; 707/100; 707/104.1; 709/204; 709/206
(58) Field of Classification Search ............ 707/3, 707/10, 100, 104.1; 709/20, 206
See application file for complete search history.

(56) References Cited

U.S. PATENT DOCUMENTS

| | | | |
|---|---|---|---|
| 5,819,921 A | 10/1998 | Schmid | |
| 6,557,004 B1 | 4/2003 | Ben-Shachar et al. | |
| 6,694,307 B2 | 2/2004 | Julien et al. | |
| 6,834,276 B1 | 12/2004 | Jensen et al. | |
| 6,944,677 B1 | 9/2005 | Zhao | |
| 7,043,531 B1 | 5/2006 | Seibel et al. | |
| 7,082,427 B1 | 7/2006 | Seibel et al. | |
| 7,136,880 B2 | 11/2006 | Wilkins et al. | |
| 7,159,036 B2 | 1/2007 | Hinchliffe et al. | |
| 2001/0002469 A1* | 5/2001 | Bates et al. | 707/1 |
| 2001/0039547 A1 | 11/2001 | Black et al. | |
| 2002/0029208 A1 | 3/2002 | Josephson | |
| 2002/0103634 A1 | 8/2002 | Ogmen | |
| 2002/0133504 A1 | 9/2002 | Vlahos et al. | |
| 2003/0050927 A1 | 3/2003 | Hussam | |
| 2003/0069874 A1 | 4/2003 | Hertzog et al. | |

(Continued)

OTHER PUBLICATIONS

"About Microsoft Outlook", 2000, Microsoft Corporation, 2 pages.*

(Continued)

*Primary Examiner*—John E Breene
*Assistant Examiner*—Hares Jami
(74) *Attorney, Agent, or Firm*—Perkins Coie LLP (57) ABSTRACT

A method and system for aggregating contact information of contacts from multiple contact sources is provided. The aggregation system collects contact information for a user from various contact sources. The aggregation system stores the collected content information in a contact data store. The aggregation system may also store an indication of the contact source of the collected contact information. The aggregation system provides a user interface through which the user may search the contact information of the contact data store to find contact information of contacts that are collected from the different contact sources. The aggregation system allows a user to add a contact to a real-time contact list to enable real-time communications with that contact.

7 Claims, 6 Drawing Sheets

U.S. PATENT DOCUMENTS

| | | | |
|---|---|---|---|
| 2004/0059781 A1* | 3/2004 | Yoakum et al. | 709/204 |
| 2004/0073607 A1 | 4/2004 | Su et al. | |
| 2004/0133561 A1* | 7/2004 | Burke | 707/3 |
| 2005/0015432 A1 | 1/2005 | Cohen | |
| 2005/0065980 A1* | 3/2005 | Hyatt et al. | 707/104.1 |
| 2005/0182837 A1 | 8/2005 | Harris et al. | |
| 2005/0204007 A1* | 9/2005 | McGregor et al. | 709/206 |
| 2005/0222989 A1 | 10/2005 | Haveliwala et al. | |
| 2006/0004869 A1 | 1/2006 | Yuster et al. | |
| 2006/0069686 A1* | 3/2006 | Beyda et al. | 707/10 |
| 2006/0195422 A1 | 8/2006 | Cadiz et al. | |
| 2006/0195472 A1 | 8/2006 | Cadiz et al. | |

OTHER PUBLICATIONS

Nenkova et al., "Email classification for contact centers", Symposium on Applied Computing archive Proceedings of the 2003 ACM symposium on Applied computing table of contents Melbourne, Florida, 2003, pp. 789-792. Download: http://portal.acm.org/citation.cfm?id=9526891.*

U.S. Office Action response filed Aug. 27, 2008 for U.S. Appl. No. 11/066,715.

U.S. Office Action response filed Sep. 9, 2008 for U.S. Appl. No. 11/067,485.

Mitel Networks, Your Assistant Flash Demonstration, Your Assistant 3.0, Downloaded from Demo at 222.mitel.com/ya on Jan. 16, 2004.

* cited by examiner

Search: J J   101

Result list

| Name | Source |
|---|---|
| J.J. Smith | PAB |
| J.J. Jones | GAL |
| J&J Acme | |

102 add to contact list   103

Contact list

| Name | Source |
|---|---|
| A.A. Abbott | PAB |
| A.B. Smith | PAB |
| B. Johns | |
| C. Jones | GAL |
| D. Thomas | WAB |
| E. Edison | |

104

Presence of contact

A.B. Smith is online
Telephone: 555-555-1234

FIG. 8

US 7,593,925 B2

METHOD AND SYSTEM FOR LOCATING CONTACT INFORMATION COLLECTED FROM CONTACT SOURCES

CROSS-REFERENCE TO RELATED APPLICATIONS

The present application is related to U.S. patent application Ser. No. 11/066,715 entitled "METHOD AND SYSTEM FOR AGGREGATING CONTACT INFORMATION FROM MULTIPLE CONTACT SOURCES" and U.S. patent application Ser. No. 11/067,485 entitled "METHOD AND SYSTEM FOR COLLECTING CONTACT INFORMATION FROM CONTACT SOURCES AND TRACKING CONTACT SOURCES," which are being filed concurrently and which are hereby incorporated by reference.

TECHNICAL FIELD

The described technology relates generally to providing contact information and particularly to providing contact information for real-time communications.

BACKGROUND

Real-time conversations between conversation participants via their computer systems are becoming increasingly common. Such real-time conversations require that the participants be present at their computer systems (e.g., personal digital assistants) and able to respond when a communication is received. A common form of real-time conversation is provided by instant messaging services. An instant messaging service allows participants to send messages and have them received within a second or two by the other participants in the conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation is not possible. Moreover, if their computers are currently powered on, but the intended participants are away from their computers, a real-time conversation is also not possible. The initiating participant would like to know the availability of the intended participants so that an appropriate decision on the form of communication can be made.

The availability status of an entity such as a computer system or a user associated with that computer system is referred to as "presence information." Presence information identifies the current "presence state" of the user. Users make their presence information available so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, then the subscribing user can then place the telephone call.

Typical presence systems and/or instant messaging systems may allow a user to maintain a list of contacts to whom the user may subscribe to presence information or may send instant messages. The systems, referred to generically as a contact server, may store for each contact a display name of the contact along with the contact's real-time identifier, such as a Session Initiation Protocol ("SIP") Uniform Resource Identifier ("URI"). The real-time identifier is a unique identification of the contact that can be mapped to the current location of the contact using SIP. When a user wants to send an instant message to a contact, a client-side component of the instant messaging system may download the contact list from the contact server. The client-side component allows the user to select the contact with whom the user wants to initiate the instant messaging session. The client-side component may also allow the user to maintain the list of contacts (i.e., "real-time contact list") by adding new contacts, updating existing contacts, and so on.

Many different systems may be used by a user to maintain information about contacts for the user. For example, the user may use electronic mail systems, cellular phones, personal digital assistants, customer relationship management systems, operating systems, and so on to maintain contact information about the user's contacts. Electronic mail systems may allow a user to maintain a personal address book that includes entries for contacts that contain the name, electronic mail address, postal address, telephone number, real-time identifier, and so on of the contact In addition, electronic mail systems may allow an enterprise to maintain a global address list that contains entries for each person associated with the organization. Some electronic mail systems may maintain replicated copies of their contact information. For example, a personal digital assistant may contain a duplicate copy of the contact information that is also stored on an electronic mail server. From time-to-time, the contact information of the personal digital assistant needs to be synchronized with that of the server. In addition, some electronic mail systems allow users to input contact information from electronic business cards rather than requiring a user to manually input the contact information.

Because contact information can be maintained by many different contact sources, it can be difficult for a user to locate contact information for a contact. When a user wants to communicate with a contact, the user needs to remember in which contact source the contact information for that contact is stored. For example, the user may store telephone numbers of some contacts in a cellular phone and may store contact information of other contacts using an electronic mail system. In such a case, the user may first use the electronic mail system to see if it contains the contact information for a certain contact. If not, the user may next use their cellular phone to see if it contains the contact information. The user may repeat this process of checking contact sources until the contact information for the contact is located. Moreover, once a user locates the contact information, assuming it is not already in the real-time contact list of the contact server, the user would need to manually add the contact information to the real-time contact list before a real-time conversation can be initiated.

It would be desirable to have a system that would somehow allow a user to have a user interface through which the user can access the contact information from different contact sources, easily locate contact information of a contact of interest regardless of the contact source, and easily add contact information to the real-time contact list to enable real-time conversations.

SUMMARY

A method and system for aggregating contact information of contacts from multiple contact sources is provided. The aggregation system collects contact information for a user from various contact sources. The aggregation system stores the collected content information in a contact data store. The aggregation system may also store an indication of the contact source of the collected contact information. The aggregation system may subscribe to the presence information of contacts when their contact information includes a real-time identifier. The aggregation system provides a user interface through which the user may search the contact information of the contact data store to find contact information of contacts that are collected from the different contact sources. The aggregation system allows a user to add a contact to a real-time contact list to enable real-time communications with that contact.

DETAILED DESCRIPTION

A method and system for aggregating contact information of contacts from multiple contact sources is provided. In one embodiment, the aggregation system collects contact information for a user from various contact sources. For example, the contact sources may include a personal address book and a global address list of an electronic mail system (e.g., Outlook), an operating system address book (e.g., Windows Address Book), a real-time contact list provided by a contact server (e.g., Microsoft's Live Communications Server), and so on. The aggregation system may initially collect the contact information whenever the user logs on to a client computer system. The aggregation system stores the collected content information in a contact data store such as a database or another data store that is accessible via the client computer system. For example, the aggregation system may store the contact information in memory or on a disk drive of the client computer system of the user. The aggregation system may also store an indication of the contact source of the collected contact information. For example, when the aggregation system collects contact information from a personal address book of the user, the aggregation system identifies the personal address book as the contact source in the contact data store for that contact. The aggregation system may store additional information in the contact data store such as the telephone number, postal address, electronic mail address, real-time identifier, and so on. The aggregation system may subscribe to the presence information of contacts when their contact information includes a real-time identifier or sufficient information is provided to discover the real-time identifier. The aggregation system provides a user interface through which the user may search the contact information of the contact data store to find contact information of contacts that are collected from the different contact sources. The aggregation system allows a user to add a contact to the real-time contact list to enable real-time communications with that contact. In this way, the aggregation system provides a single user interface through which a user can access contact information stored in different contact sources.

In one embodiment, the aggregation system upon initialization collects contact information from the different contact sources and stores the contact information in the contact data store, which is created anew during each initialization. Although the contact information is up to date at the time of initialization, it may become out of date quickly. In particular, a user may go directly to a contact source and add, update, or delete contact information. The contact data store will thus become unsynchronized with the contact source. To ensure that the contact data store stays relatively synchronized with the contact sources, the aggregation system may register to receive update events from the contact sources. When the aggregation system receives an update event, it updates the contact information in the contact data store. Some contact sources may not provide update event notifications. If so, the aggregation system may periodically poll the contact sources to determine if any of the contact information has been updated. Whenever the aggregation system updates the contact data store, the user interface component of the aggregation system may be notified so that it can refresh its display.

In one embodiment, the aggregation system allows the contact information of a contact to be updated within the context of the user interface of the contact source. When the aggregation system collects contact information, it records the contact source of the contact information. When a user wants to update contact information for a contact, the aggregation system identifies the contact source from the contact data store and requests the application associated with that contact source to provide the user interface for updating the contact information. For example, if the contact source is a personal address book of an electronic mail system, then the aggregation system may use the API of the electronic mail system to provide a user interface for updating the contact information. When the user interface is displayed, the user may update the contact information in the context of the application associated with the contact source. Whenever the contact information of the contact source is updated, the contact source notifies the aggregation system so that it can update its contact data store accordingly. For example, when a user wants to update the real-time identifier of a user whose contact information was collected from an electronic mail system, the aggregation system may request the update user interface of the electronic mail system. When the user has updated the real-time identifier, then the electronic mail system may send an update event to the aggregation system indicating the new real-time identifier.

In one embodiment, the aggregation system allows a user to search for contact information about a contact. To search for the contact information, the aggregation system allows a user to enter a search criterion for a contact. The aggregation system searches the contact data store for contact information of the contacts that match the search criterion. The aggregation system may search various fields of the contact information, such as first name, last name, electronic mail alias, company name, and so on. Since the contact data store contains contact information from multiple contact sources, the search is effectively across multiple contact sources. The aggregation system may order the search results based on the contact source. For example, the aggregation system may order contact information from a personal address book before contact information from a global address list under the assumption that a personal address book contains the contacts that are most likely to be of interest to the user. The aggregation system may also subscribe to presence information for those contacts that match the search criterion (assuming that the contact information of a contact includes the real-time identifier) and display the presence information along with the contact information. The presence information may include additional information that may be more up to date than the contact information of the contact source. For example, the presence information may indicate a new telephone number for a contact or a telephone number at which the contact can be currently reached.

In one embodiment, the aggregation system allows a user to add a contact of a search result to the real-time contact list. When a user indicates to add a contact, the aggregation system may notify the contact server so that it can update its real-time contact list. After the contact server updates its real-time contact list, it may send an update event to the aggregation system. Upon receiving the update event, the aggregation system updates its contact data store. The aggregation system may also notify its user interface component so that it can refresh its user interface to indicate the contact that has been added to the real-time contact list.

Figure 1:
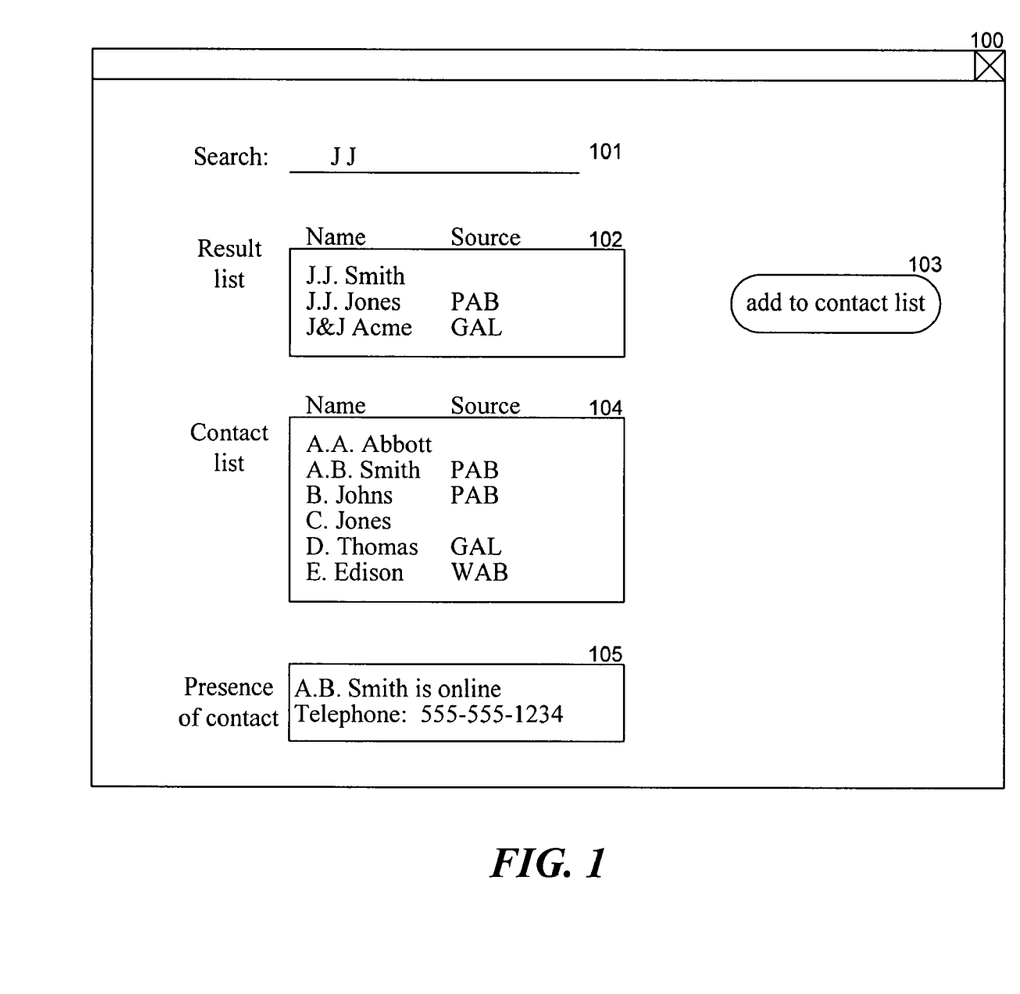
FIG. 1 illustrates a display page of the user interface of the aggregation system in one embodiment.

FIG. 1 illustrates a display page of the user interface of the aggregation system in one embodiment. The display page 100 includes a search field 101, a results list area 102, an add to contact list button 103, a contact list area 104, and a presence information area 105. When the display page is first displayed, the contact list area contains an entry for each contact of the real-time contact list (using scroll bars as appropriate). A user enters a search criterion into the search field to perform a search. The aggregation system searches the contact data store for contacts that match the search criterion. As the user enters the search criterion, the results list area is updated to reflect the contacts that match the portion of the search criterion entered so far. For example, the results list area may be updated after each character of the search criterion is added or removed. The aggregation system may search various fields of the contact data store including first name, last name, company, electronic mail alias, and so on. The aggregation system may also allow a user to perform searches based on other information of the contact data store. The aggregation system may provide an "advanced search" button to specify additional search criteria such as phone number, division, location (e.g., postal address), job title, and so on. Although not shown, the results list area and the contact list area may also include presence information for the contacts if available. The results list area and the contact list area also contain an identification of the contact source. A blank contact source indicates that the contact information for the contact was added directly into the real-time contact list without having any other contact source. When a user wants to add a contact of the results list area to the real-time contact list, the user selects the contact in the results list area and then selects the add to contact list button. The aggregation system notifies the contact server of the addition to the real-time contact list. The contact server updates its real-time contact list and sends an update event to the aggregation system. Upon receiving the update event, the aggregation system updates its contact data store and refreshes the contact list area of the display page. When a user selects a contact from the results list area or the contact list area, the aggregation system may display presence information and other contact information in the presence information area. When a user selects a contact from the results list area or the contact list area, the aggregation system directs the application associated with the contact source to provide a user interface for viewing and modifying the contact information of that user.

Figure 2:
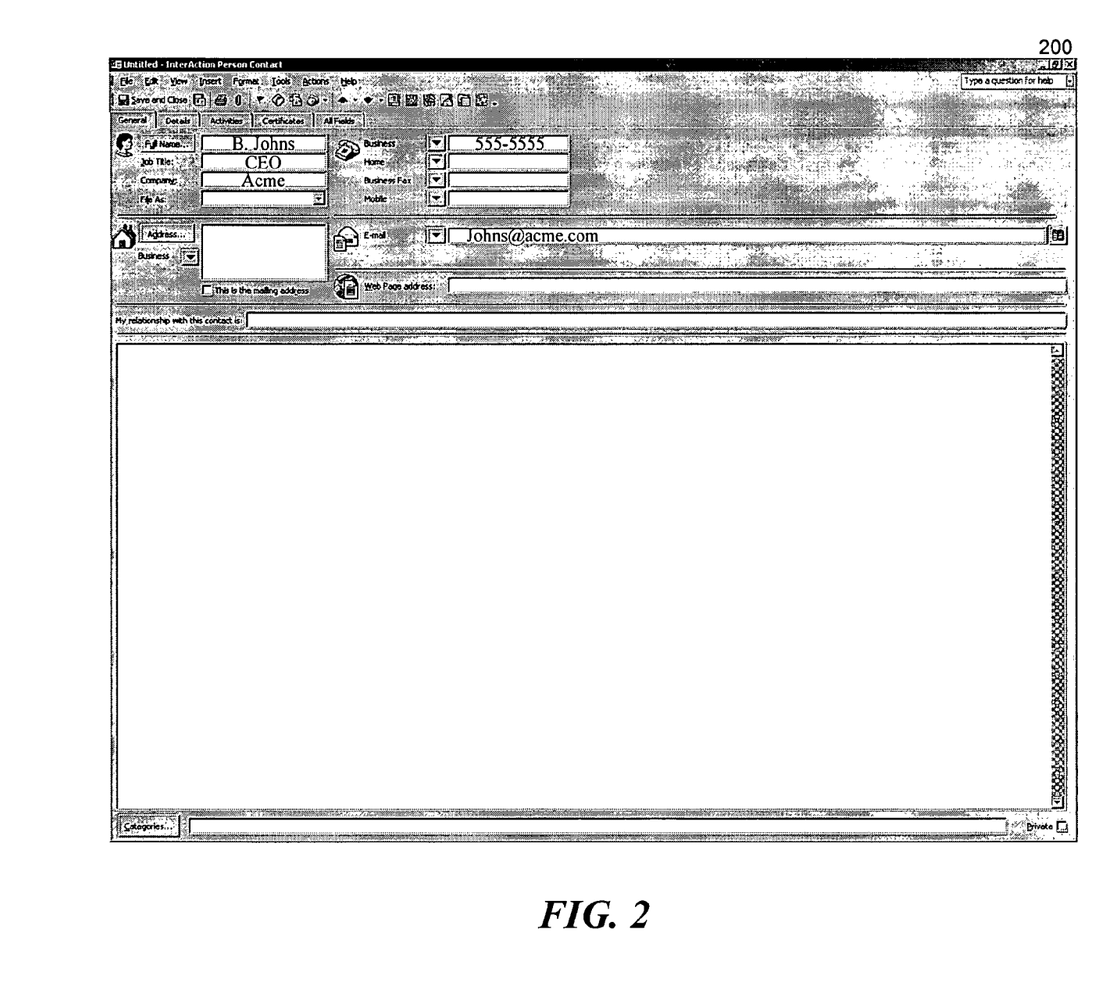
FIG. 2 illustrates a display page of the user interface provided by an application associated with a contact source in one embodiment.

FIG. 2 illustrates a display page of the user interface provided by an application associated with a contact source in one embodiment. The display page 200 represents the user interface provided by Microsoft Outlook for maintaining contact information of a personal address book. The aggregation system invokes the APIs of Outlook passing the identification of the contact whose information is to be edited. Outlook then displays the display page with the contact information of the identified contact. When the contact information is updated by a user, Outlook sends an update event to the aggregation system. Upon receiving the update event, the aggregation system updates its contact data store and refreshes its user interface as appropriate. One skilled in the art would appreciate that each contact source may provide its own user interface for maintaining contact information. Alternatively, the aggregation system could provide a uniform user interface for updating contact information and invoke the APIs of the associated applications to effect the updating of the contact information at the contact source.

Figure 3:
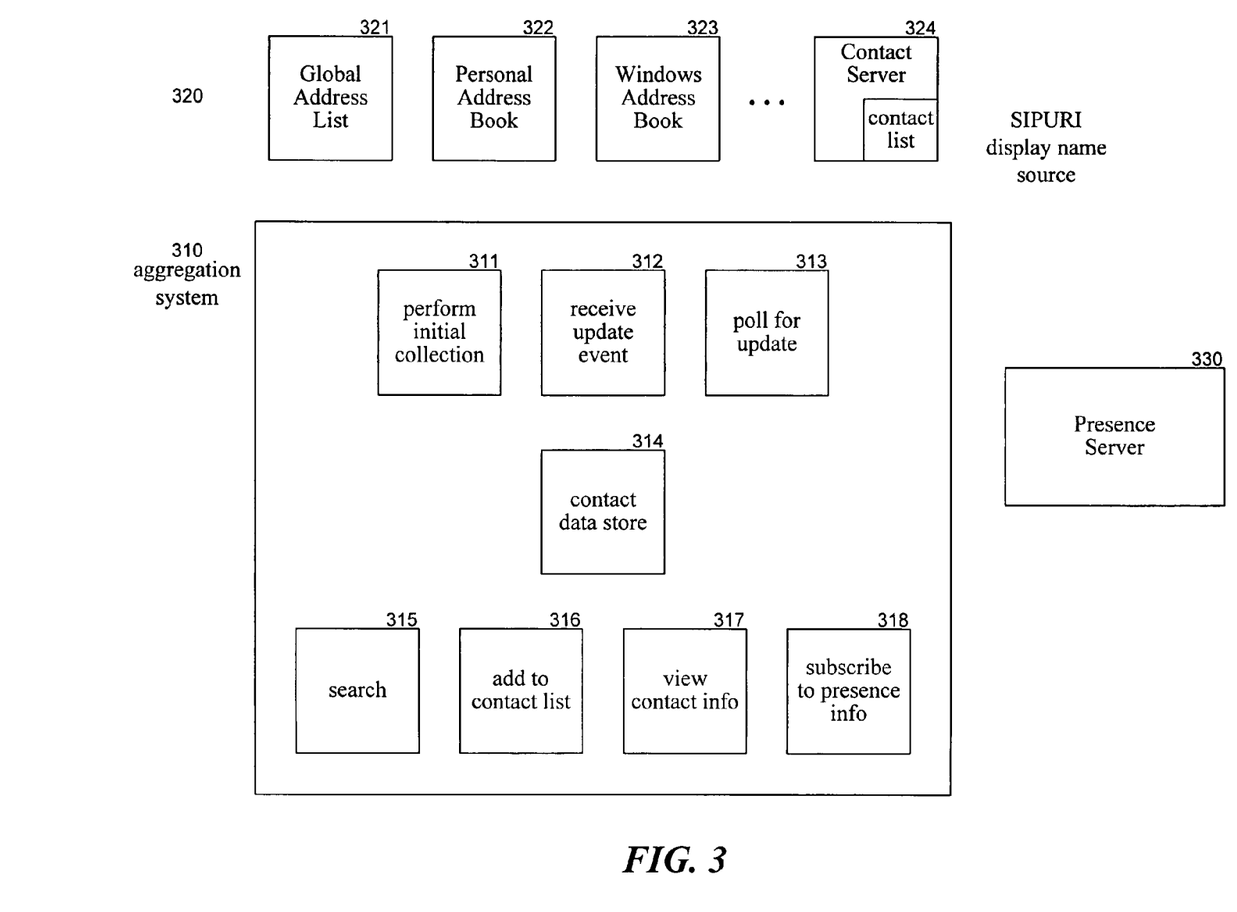
FIG. 3 is a block diagram that illustrates components of the aggregation system in one embodiment.

FIG. 3 is a block diagram that illustrates components of the aggregation system in one embodiment. The aggregation system 310 interfaces with contact sources 320 and a presence server 330. The contact sources may include a global address list 321, a personal address book 322, a Windows address book 323, and a contact server 324. The contact server maintains the real-time contact list. The entries of the real-time contact list include real-time identifier, display name, and contact source. The aggregation system includes a perform initial collection component 311, a receive update event component 312, and a poll for update component 313, which are used to maintain the contact data store 314. The aggregation system also includes a search component 315, an add to contact list component 316, a view contact information component 317, and a subscribe to presence information component 318. An instance of the aggregation system executes on each client computer system and stores at the contact information for the contacts of a logged-on user. When the aggregation system is initialized, the perform initial collection component is invoked to collect contact information from the various contact sources. The perform initial collection component initializes the contact data store by storing the collected contact information in it. The contact data store may be emptied prior to storing the collected information. The receive update event component is invoked when an update event is received from a contact source. The receive update event component updates the contact data store as appropriate and may notify a user interface component to refresh the user interface. The poll for update component may be invoked periodically to check for changes in contact information of contact sources that do not provide event notifications. The search component is invoked when a user specifies a search criterion. The add to contact list component is invoked when a user indicates to add a contact to the real-time contact list. The view contact information component is invoked when a user wants to view contact information of a contact in the context of the application associated with the contact source. The subscribe to presence information component is invoked to subscribe to the presence information of a contact as provided by the presence server.

The computing device on which the aggregation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the aggregation system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the aggregation system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The aggregation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
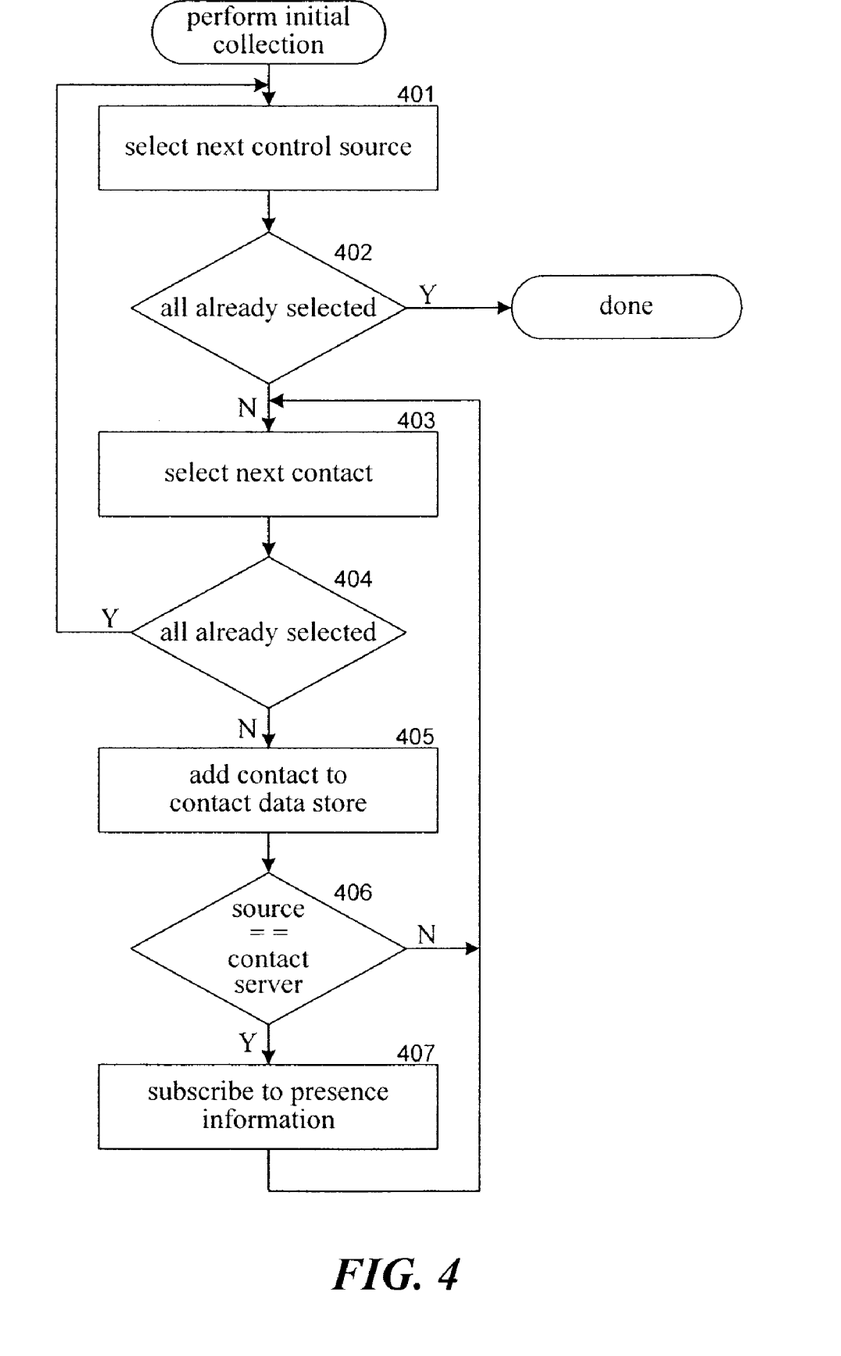
FIG. 4 is a flow diagram that illustrates the processing of the perform initial collection component of the aggregation system in one embodiment.

FIG. 4 is a flow diagram that illustrates the processing of the perform initial collection component of the aggregation system in one embodiment. The component is invoked when the aggregation system first initializes. The component may initially empty the contact data store. In blocks 401-407, the component loops selecting each contact source and each contact within each selected contact source and adding the contact information to the contact data store. The component may also subscribe to presence information of contacts in the real-time contact list. In block 401, the component selects the next contact source. In decision block 402, if all the contact sources have already been selected, then the component completes, else the component continues at block 403. In block 403, the component selects the next contact of the selected contact source. In decision block 404, if all the contacts of the selected contact source have already been selected, then the component loops to block 401 to select the next contact source, else the component continues at block 405. In block 405, the component adds the selected contact to the contact data store. The information added to the contact data store includes an indication of the contact source of the contact and a unique identifier of the contact within the contact source. The unique identifier may be used to correlate contacts in the real-time contact list with the corresponding contacts in their contact sources. In decision block 406, if the selected contact source is the contact server, then the component continues at block 407, else the component loops to block 403 to select the next contact of the selected contact source. In block 407, the component subscribes to the presence information of the selected contact and then loops to block 403 to select the next contact of the selected contact source.

Figure 5:
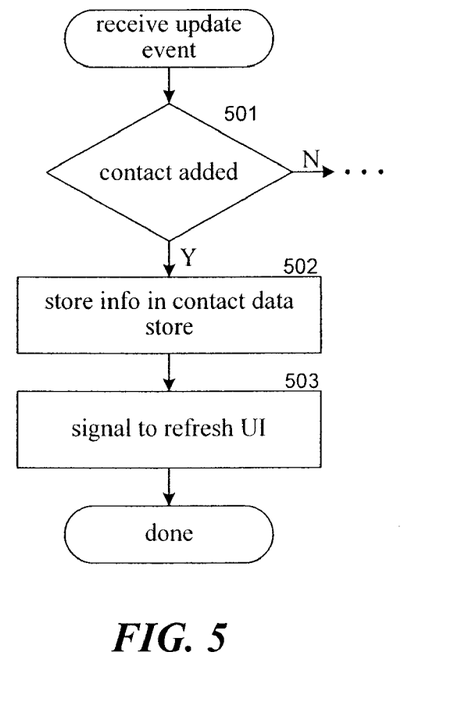
FIG. 5 is a flow diagram that illustrates the processing of the receive update event component of the aggregation system in one embodiment.

FIG. 5 is a flow diagram that illustrates the processing of the receive update event component of the aggregation system in one embodiment. The component is invoked when the aggregation system receives an update event from a contact source. In decision block 501, if the update event indicates that a contact has been added to the real-time contact list, then the component continues at block 502, else the component continues to process another type of event. Other update events may be received from other contact sources and may indicate that a contact has been added to or removed from a contact source or that the information for the contact has been updated at the contact source. When such events are received, the component updates the contact data store and signals the user interface component to refresh the user interface. In block 502, the component stores the contact information in the contact data store. In block 503, the component signals to the user interface component of the aggregation system to refresh the user interface. The component then completes.

Figure 6:
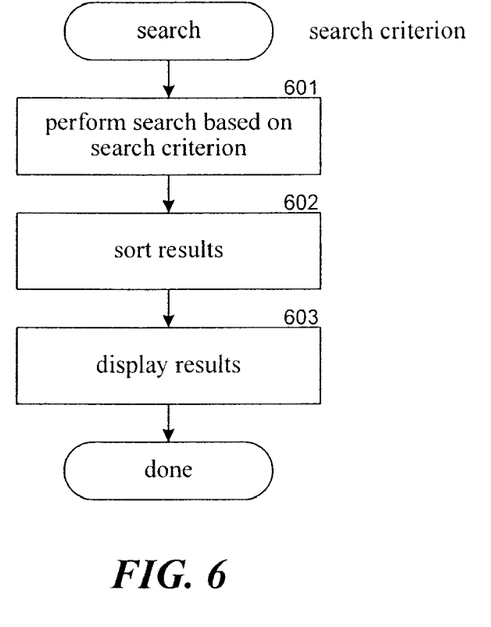
FIG. 6 is a flow diagram that illustrates the processing of the search component of the aggregation system in one embodiment.

FIG. 6 is a flow diagram that illustrates the processing of the search component of the aggregation system in one embodiment. The component is passed a portion of the search criterion that the user has entered so far. In block 601, the component performs a search of the contact data store based on the passed search criterion. In block 602, the component sorts the results of the search based on the contact source from which the contact information was collected. The component may subscribe to the presence information of those contacts in the results of the search whose presence information is not already subscribed to (assuming the contact information of the contact includes a real time identifier). The component may display the contact's presence information as part of the results. In block 603, the component displays the search results and then completes.

Figure 7:
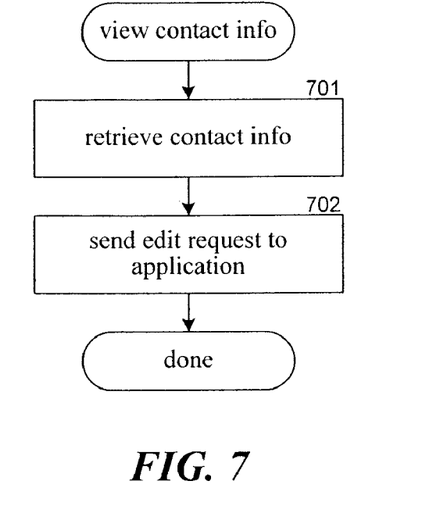
FIG. 7 is a flow diagram that illustrates the processing of the view contact information component of the aggregation system in one embodiment.

FIG. 7 is a flow diagram that illustrates the processing of the view contact information component of the aggregation system in one embodiment. The component is invoked when a user indicates to view contact information associated with a selected contact. The component requests the application associated with the contact source of the selected contact to provide the user interface for editing the contact information of the selected contact. In block 701, the component retrieves the contact information of the selected contact from the contact data store. In block 702, the component sends a request to the application associated with the contact source to edit the contact information of the selected contact. If the application is not currently executing, then a new instance of the application may be launched. When the application program detects that contact information has been updated, it may send an update event to the aggregation system so that it can update the contact data store. The component then completes.

Figure 8:
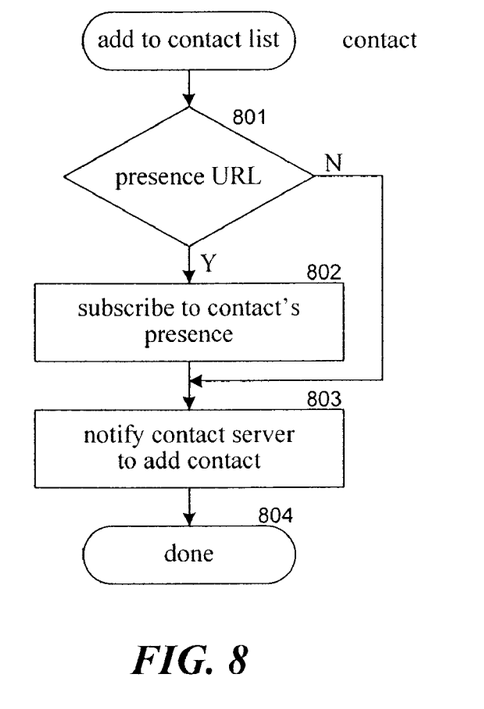
FIG. 8 is a flow diagram that illustrates the processing of the add to contact list component of the aggregation system in one embodiment.

FIG. 8 is a flow diagram that illustrates the processing of the add to contact list component of the aggregation system in one embodiment. The component is passed an indication of a contact and notifies the contact server to add the passed contact to the real-time contact list. The component may also subscribe to the presence information of the newly added contact. In decision block 801, if a real-time identifier is provided with the contact information of the contact, then the component continues at block 802, else the component continues at block 803. In block 802, the component subscribes to the presence information of the contact. In block 803, the component notifies the contact server to add the contact. When the contact server completes the adding of the contact, it sends an update event notification to the aggregation system so that the aggregation system can update its contact data store as appropriate. The component then completes.

From the foregoing, it will be appreciated that specific embodiments of the aggregation system have been described herein for purposes of illustration, but that various modifications may be made without deviating from the spirit and scope of the invention. In one embodiment, the aggregation system may attempt to match information from different contact sources that are for the same contact. Once the information from multiple contact sources is matched, the aggregation system can aggregate the information into a single record in the contact data store. The aggregation system may use various techniques to match information of contact sources. The aggregation system may use the real-time identifier (e.g., SIP URI), electronic mail address, name, phone number, and so on. To reduce false positive matches, the aggregation system may match on various combinations of this information. The aggregation system may also attempt to resolve conflicts between information from different contact sources for the same contact. For example, the postal addresses of the different contact sources may be different because of a recent move. The aggregation system may assign a priority to the contact sources (e.g., set by designer or end user) and resolve the conflicts in favor of the contact source with the higher priority. The aggregation system may also keep the conflicting information (e.g., show multiple postal addresses). The aggregation system may also allow the user to choose between the conflicting information for a contact. In one embodiment, the aggregation system may use an existing contact source as the contact data store. For example, the aggregation system may aggregate contact information from different contact sources into an existing personal address book. In one embodiment, the aggregation system may collect and store all the information of a contact source. That information may include electronic mail addresses, phone numbers, postal addresses, job title, company, office, division, manager, web site address, and so on. Accordingly, the invention is not limited except as by the appended claims.

We claim:

1. A method in a computer system having a memory and a processor for locating contact information of contacts of a user, the method comprising:

for a plurality of sources of contact information that contain contact information of the user, retrieving contact information of contacts of the user from the contact sources and assigning priorities to the contact sources so that each contact source has an assigned priority;

for each contact of the user, aggregating, by a processor executing instructions stored in the memory, into aggregated contact information of the contact, the contact information retrieved from different contact sources, wherein the aggregated contact information associates contact information of the contact collected from different contact sources that describe the same contact and wherein conflicts between the contact information collected from different contact sources are resolved based at least in part on priorities assigned to the different contact sources;

storing the aggregated contact information of the contact in a contact store; and when the aggregated contact information of the contact includes a real-time identifier of the contact, subscribing to receive presence information of the contact identified by the real-time identifier;

receiving presence information of contacts in response to subscribing to the presence information of the contacts; and after storing the aggregated contact information in the contact store, receiving from the user a search request for contact information of a contact;

searching, by a processor executing instructions stored in the memory, the contact store for one or more contacts whose aggregated contact information satisfies the search request;

displaying, by a processor executing instructions stored in the memory, aggregated contact information and presence information of the one or more contacts whose aggregated contact information satisfies the search request, the displayed aggregated contact information of the contacts being ordered based on the contact source from which the contact information of the contacts is collected, wherein contact information collected from a personal contact source is ordered before contact information of a global contact source; and after receiving from the user a request to add to a real-time contact list a contact whose aggregate contact information is displayed, adding the contact to the real-time contact list, the real-time contact list being a list of contacts with whom the user can initiate a real-time conversation, the contact being added without the user having to manually add contact information of the contact to the real-time contact list; and after the contact has been added to the real-time contact list and after receiving from the user a selection of the contact from the real-time contact list, initiating a real-time conversation between the user and the contact wherein the contact store is searched for aggregated contact information of a contact when a search request is received rather than searching each of the different contact sources when a search request is received.

2. The method of claim 1 wherein the contact information of each contact includes an identification, a telephone number, and a real-time identifier of the contact.

3. The method of claim 1 including wherein the search criterion is applied to one or more of a first name, a last name, a company name, or an electronic mail alias.

4. The method of claim 1 wherein contact information for the contact is displayed within the context of an application associated with the contact source from which contact information of the contact was collected.

5. The method of claim 1 wherein contact information for the contact is edited within the context of an application associated with the contact source from which contact information of the contact was collected.

6. A computing device with a central processing unit and memory for locating contact information of contacts of a user, the system comprising:
   a processor; and
   a memory containing computer-executable instructions comprising:
      a component that, for a plurality of sources of contact information that contain contact information of the user, retrieves contact information of contacts of the user from the contact sources and assigns priorities to the contact sources so that each contact source has an assigned priority,
      a component that, for each contact of the user,
         aggregates, by a processor executing instructions stored in the memory, into aggregated contact information of the contact, the contact information retrieved from different contact sources, wherein the aggregated contact information associates contact information of the contact collected from different contact sources that describe the same contact and wherein conflicts between the contact information collected from different contact sources are resolved based at least in part on priorities assigned to the different contact sources,
         stores the aggregated contact information of the contact in a contact store, and
         when the aggregated contact information of the contact includes a real-time identifier of the contact, subscribes to receive presence information of the contact identified by the real-time identifier,
      a component that receives presence information of contacts in response to subscribing to the presence information of the contacts, and
      a component that, after storing the aggregated contact information in the contact store,
         receives from the user a search request for contact information of a contact,
         searches, by a processor executing instructions stored in the memory, the contact store for one or more contacts whose aggregated contact information satisfies the search request,
         displays, by a processor executing instructions stored in the memory, aggregated contact information and presence information of the one or more contacts whose aggregated contact information satisfies the search request, the displayed aggregated contact information of the contacts being ordered based on the contact source from which the contact information of the contacts is collected, wherein contact information collected from a personal contact source is ordered before contact information of a global contact source, and
         after receiving from the user a request to add to a real-time contact list a contact whose aggregate contact information is displayed,
            adds the contact to the real-time contact list, the real-time contact list being a list of contacts with whom the user can initiate a real-time conversation, the contact being added without the user having to manually add contact information of the contact to the real-time contact list, and
            after the contact has been added to the real-time contact list and after receiving from the user a selection of the contact from the real-time contact list, initiates a real-time conversation between the user and the contact
      wherein the contact store is searched for aggregated contact information of a contact when a search request is received rather than searching each of the different contact sources when a search request is received.

7. The computing device of claim 6 wherein contact information for the contact is edited within the context of an application associated with the contact source from which contact information of the contact was collected.

* * * * *

UNITED STATES PATENT AND TRADEMARK OFFICE
CERTIFICATE OF CORRECTION

PATENT NO. : 7,593,925 B2 Page 1 of 1
APPLICATION NO. : 11/067615
DATED : September 22, 2009
INVENTOR(S) : Cadiz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this

Fourteenth Day of December, 2010

David J. Kappos
*Director of the United States Patent and Trademark Office*